F. E. PENDLETON.
FLUID METER.
APPLICATION FILED MAR. 31, 1915.

1,264,553.

Patented Apr. 30, 1918.
4 SHEETS—SHEET 2.

WITNESSES

INVENTOR
F. E. Pendleton
BY
ATTORNEY

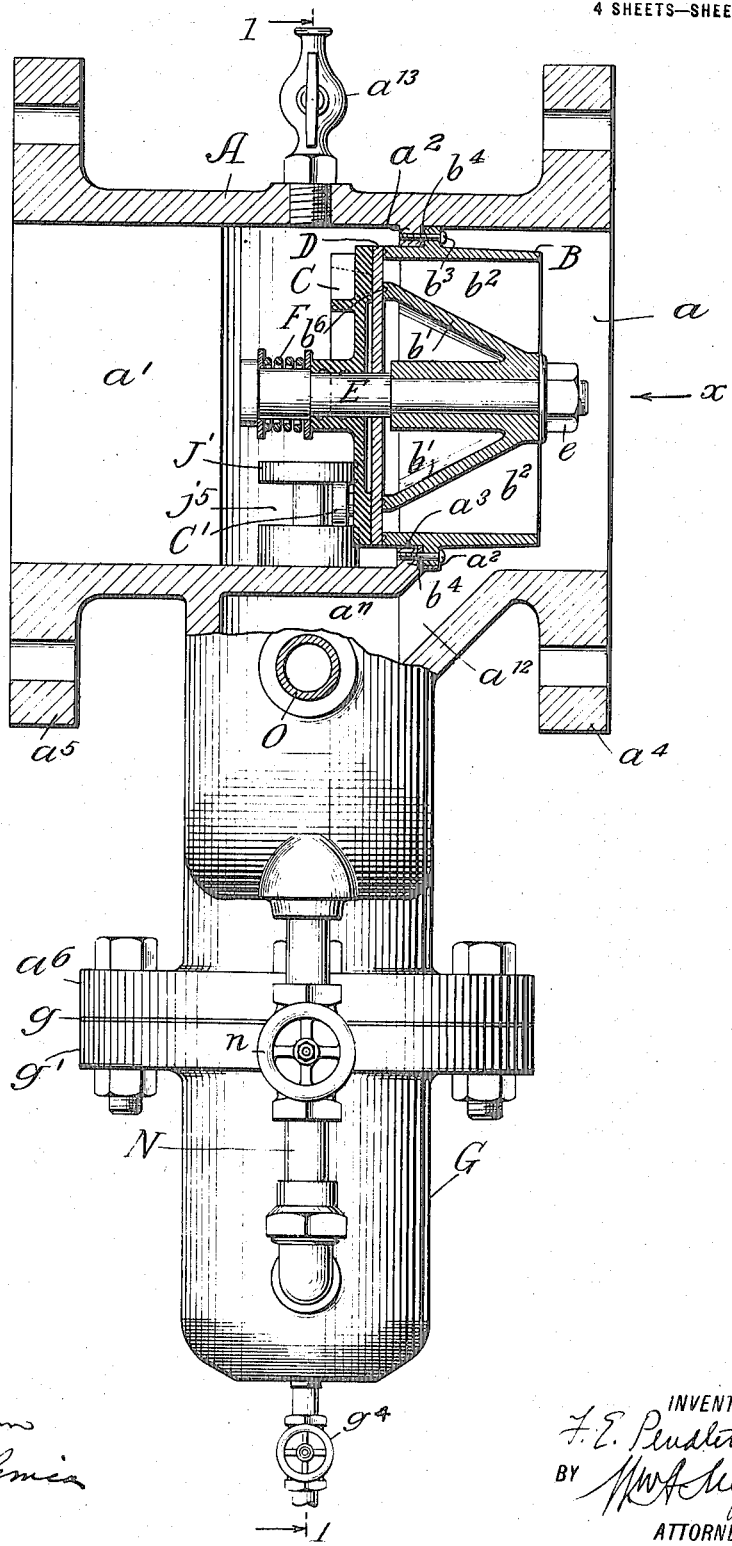

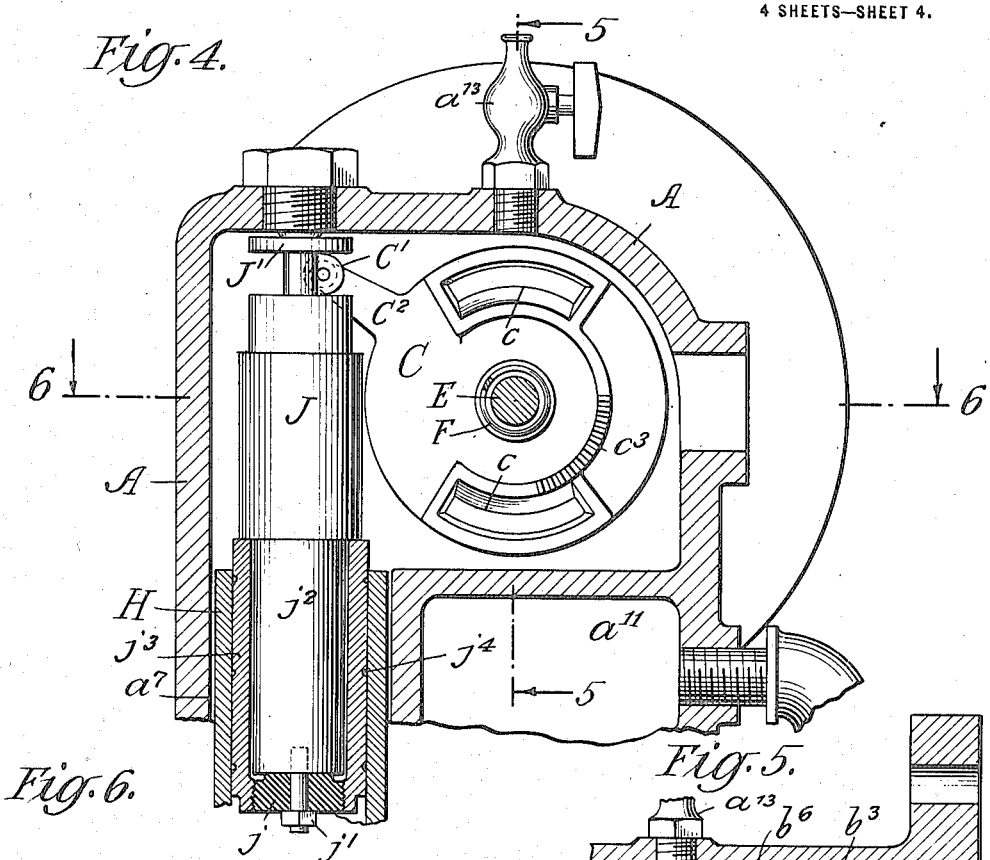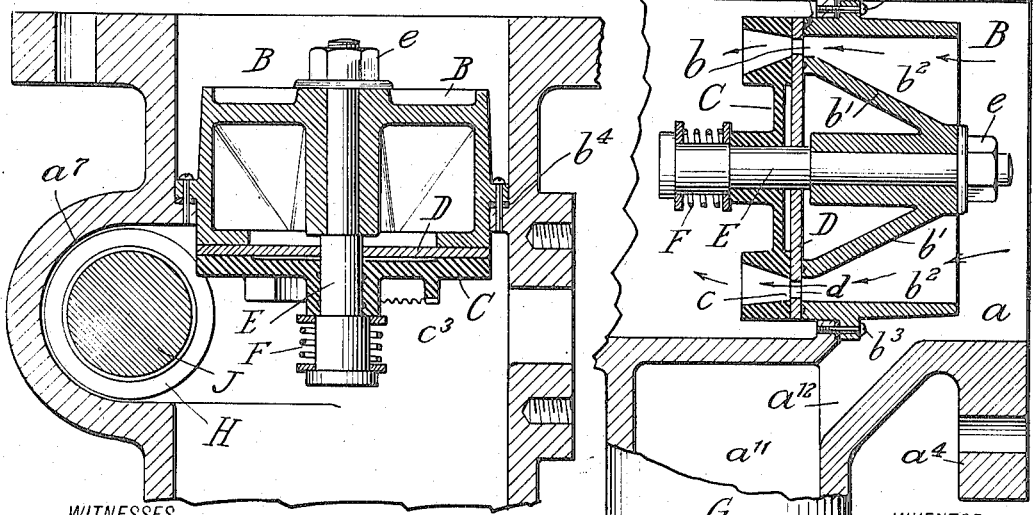

UNITED STATES PATENT OFFICE.

FRANK E. PENDLETON, OF MONTCLAIR, NEW JERSEY.

FLUID-METER.

1,264,553.  Specification of Letters Patent.  Patented Apr. 30, 1918.

Application filed March 31 1915. Serial No. 18,228.

*To all whom it may concern:*

Be it known that I, FRANK E. PENDLETON, a citizen of the United States, and a resident of Montclair, county of Essex, and State of New Jersey, have invented certain new and useful Improvements in Fluid-Meters, of which the following is a specification.

Meters for the measurement of fluids may be divided into two main classes, displacement meters and flow meters. Displacement meters are generally employed where the rate of flow of the fluid is relatively low and flow meters where the rate of flow is relatively high. In the displacement meter a moving element or elements travels through a complete cycle during which time the fluid is alternately admitted to and discharged from a predetermined space, the number of cycles being registered on a properly calibrated dial in such manner that the reading of the total volume of fluid passed through the meter may be readily ascertained. Where the rate of flow of the fluid is high the moving elements of the displacement meter must travel at extreme speed, producing friction and wear on the parts, or the meter must be of unusual size. In the measurement of certain fluids of low density such as steam or air, leakage is excessive. Flow meters are therefore employed, and they may be divided into two general classes, viz: First, those provided with a pipe, orifice or port of constant size, there being a difference of pressure of the fluid which varies with the velocity of the flow and becomes a measure of the rate of flow of the fluid; second, those wherein there is a constant difference of pressure of the fluid which passes through an orifice or port which varies in size with the rate of flow of the fluid, and the record of such variation becomes a measure of the rate of flow. This class of meter is referred to as one in which the flow produces its own orifice. There is also a type of meter in which the impingement of the moving fluid upon blades or vanes produces a movement varying with the velocity of the fluid, such as anemometers, turbine-water meters and so forth.

Heretofore in that class of flow meters wherein the flow produced its own orifice the variation in the size of the orifice has usually been produced by the movement of a movable element or valve toward or from a stationary element or seat. This variation in the area of the orifice has usually been caused by the variation of the space between two such elements, or the variation of the area of an opening or port in the movable element as it moved toward or from the stationary element. In some cases the orifices or ports between the two elements have been so formed that the movement of the movable element has been directly proportional to the rate of flow of the fluid and has furnished a continuous record of such flow which could be integrated between different periods of time to determine the total quantity of fluid passing through the meter. In this form of meter a part or surface of the movable element has usually formed a side or boundary of the orifice or port, and the constant weight of the moving element has produced the difference of pressure between the two sides of the orifice in such manner that the moving element is supported by and floats in the flowing volume of fluid.

In these forms of flow meters with the parts so related, objectionable features inherent in the relationship of the parts have been observed, which produce or are likely to produce interference in the operation of the moving parts, too great difference of pressure and undue wear with a consequent inaccuracy of the device. Some of the objectionable features may be stated as follows:

1. The relation of elements whereby a part or surface of the moving element forms a side or boundary of the measuring orifice while at the same time the weight of such moving element produces the difference of pressure that causes the rapid flow of fluid through such orifice, as occurs in that form of meter having a tapered or conical valve. In such a construction the relationship and functions of the elements necessitate the flow of fluid through the meter in a general vertical direction. As the delivery of fluid through pipes is generally in a horizontal direction, this arrangement of elements requires changes of direction of flow of the fluid in passing through the meter, and such valve, with its supporting spindle and guides or journals, requires a formation and construction of parts and casing having a relatively great vertical dimension, producing a heavy and bulky device requiring, in some cases, a special form of support differing from the usual pipe supports or hangers.

2. In order to secure a sufficient area of the orifice, the tapered valve must be of large size in large meters, presenting a large surface to the supporting volume of moving fluid, and the valve must be of correspondingly increased weight to produce the required difference of pressure per unit of area, with a corresponding increase of the total size, weight and cost.

3. In that form of meter where the tapered valve forms one boundary of an orifice between it and a surrounding circular and stationary seat element, the area of the tapered valve presented to the moving volume of fluid at the level of the stationary seat decreases as the valve rises and with a constant weight of valve produces an increasing and inconstant difference of pressure at the orifice in such manner that the reduction of pressure of the fluid, due to the meter, varies with the changing flow.

4. In that form of meter where the moving valve element produces a closing of the orifice by a nicety of fit within a stationary circular seat element, the repeated closure of the orifice produces wear upon the parts in contact, eventually increasing the size of the orifice and producing errors in registration.

5. That form of meter where the moving element floats in or is supported by the moving fluid, the spindle supporting the moving element together with the guides or journals in which the spindle moves are exposed to the flow of the fluid passing through the meter, and the movement of the spindle within the guides or journals is liable to interference due to particles of grit or accumulation of scale carried by the fluid.

6. In that form of meter pulsations in the volume of fluid passing through the meter produce oscillations in the moving element which can only be reduced to a minimum by an elaborate form of dash pot inclosing a piston which is connected in some manner to the moving element. Furthermore, a proper lubrication of the elements having appreciable movement has not been developed, and in general such forms of meters have not lent themselves to development of lightness, compactness and cheapness of construction, nor to interchangeability of parts, nor to ease of assemblage of parts, nor to positiveness of action.

One of the objects of my invention is to overcome the defects in prior meters and to produce a flow meter of such construction that the direction of flow of the fluid is maintained in the pipe leading to and from the meter. Also, to produce a meter whereby the moving element the weight of which is to be supported by the moving volume of fluid, does not form a part or boundary of the orifice or port in the meter, but consists of a separate element connected in proper manner to the moving element, and which separate element may be of a size and weight not governed by the size of the port or the meter. Also to produce a construction whereby the moving element, the weight of which is to be supported by the moving volume of fluid, presents the same area at all times to the supporting pressure, thereby producing a constant difference of pressure at the port in such manner that the reduction of pressure of the fluid, due to the meter, is the same at all rates of flow. Also to provide a construction whereby a valve element moves laterally across the orifice or port in a seat element with which the valve element is held in close contact, and in such manner that the parts of the valve and seat elements, which form the boundaries of the port, do not contact with each other upon closing the port but move laterally one past the other, and wear of the port does not occur. Also to produce a construction whereby the moving element, the weight of which is supported by the moving volume of fluid, is located in a position not exposed to the flow of fluid passing through the meter and where the guide or journal in which the element moves is submerged in a liquid and in such position that no interference or sticking can occur due to particles of grit or accumulation of scale carried by the fluid. Also to produce a construction whereby the oscillation of the moving element, due to pulsations in the volume of fluid passing through the meter, is easily reduced to a minimum. Also to produce a meter of comparative lightness, compactness and cheapness, and one in which the parts can be easily assembled and are interchangeable, and in which positiveness of action of the device may be maintained. Other objects will appear from the hereinafter description.

On the drawings, wherein the same reference character indicates the same part in the several views:

Fig. 3 is a sectional view partly in elevation on the staggered line 3 of Fig. 1.

Fig. 4 is a sectional view showing certain of the parts in Fig. 1 with the valve in its raised position.

Fig. 5 is a sectional view on line 5 of Fig. 4.

Fig. 6 is a sectional view on line 6 of Fig. 4.

Figure 7:
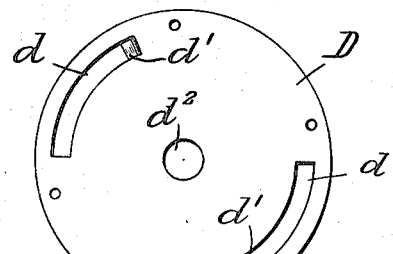
Fig. 7 is a face view of a valve plate.
Figure 10:
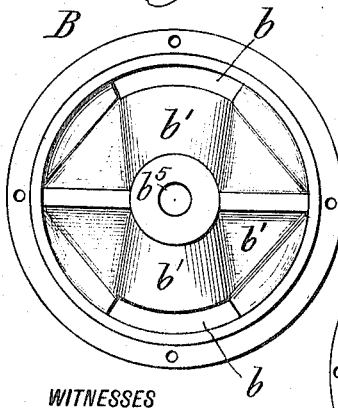
Fig. 10 is a view of the opposite face thereof.
Figure 9:
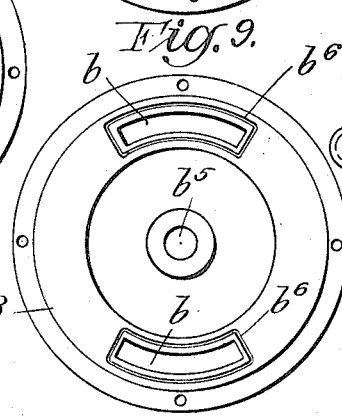
Fig. 9 is a view of one face of the stationary or seat element.
Figure 8:
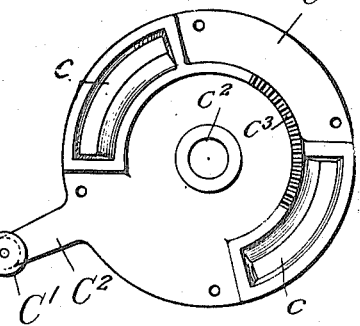
Fig. 8 is a front view of the valve to which the valve plate shown in Fig. 7 is attached.

The part marked A on the drawing represents a body or casing which, as shown, is of special construction although it may be a short section of pipe. This casing is divided into two chambers $a$ and $a'$ by a wall partition or diaphragm $a^2$, having an opening $a^3$ therein. This casing may be provided with flanges $a^4$ and $a^5$ by which connection may be made to a suitable line of pipe through which the fluid to be measured flows. B is a stationary seat element provided with ports $b$. This element is provided with inclined walls $b'$ which form tapered passageways $b^2$ leading to the ports $b$. The said seat element is secured in the opening $a^3$ in the partition or diaphragm $a^2$ by screws or other fastening means $b^3$, there being a packing ring or gasket $b^4$ to prevent the passage of any fluid between the said seat element and the wall or diaphragm $a^2$. C is a movable element which as here shown is in the form of a circular plate, having ports $c$, $c$, therein. In the construction shown this valve is mounted to rotate on an axis in line with the axis of the meter and pipe line. D is a disk made preferably of sheet brass or other suitable material, having orifies or ports $d$, $d$, therein of a predetermined and preferably uniform width slightly less than the width of the ports $b$ and $c$ in the seat element and the valve element. The openings in the disk D are cut or beveled at one end to form a tapered edge $d'$, as shown in Fig. 7, so that when the valve is slightly open the ports $b$ will be slightly uncovered and the fluid will flow in radial lines from the ports without interference by a side wall thereof. This disk is securely fastened to the inner face of the valve C by screws or other suitable means, and in such position that the ports $d$ thereof will register with the ports $c$ in the valve. E is a spindle or bolt passing through the openings $d^2$ and $c^2$ of the disk D and valve C and through the opening $b^5$ in the seat element B and is securely held in place in the seat element by the nut $e$ on the inner end thereof, the openings $d^2$ and $c^2$ being slightly larger than the diameter of the bolt so that these elements may be rotated on the bolt. Surrounding the head of the bolt is a spring F of such tension that the valve C, or rather the disk D secured to the face of the valve in the construction shown, is held in yielding contact with the face of the seat element B. A water channel $b^6$ is formed around the ports $b$ in the said seat element to assist in preventing leakage between the valve and said seat. G is a cup which is bolted or fastened to the body of the casing A with a packing or gasket $g$ between the flanges $g'$ of the cup and $a^6$ of the casing to prevent leakage. Secured to the cup G and projecting upwardly into the cylindrical recess or chamber $a^7$ of the casing A is a tube H made of brass or other suitable material. Within the tube is a cylindrical movable element or piston J having a diameter somewhat less than the inner diameter of the tube H so that it may move easily therein. The weight of this piston is to be supported by the flowing volume of fluid in the manner to be hereinafter described. To the lower end of this movable element or piston is secured a disk $j$ by means of the stud bolt and nut $j'$. The lower portion $j^2$ of the piston is reduced in diameter and around this portion fits the sleeve or tube $j^3$ which is secured to the disk $j$ by screwthreads as shown. The outer diameter of this sleeve $j^3$ is slightly less than the inner diameter of the tube H and the periphery of the sleeve $j^3$ is provided with annular water rings $j^4$ which together with the closeness of the fit between it and the tube H prevent the escape of any liquid of suitable viscosity from the cup G past the piston or plunger J into the chamber $a'$. To the upper end of the piston or plunger J is secured an extension $J'$ of suitable material to withstand corrosion. This extension is provided with an annular recess $j^5$ to receive the roller $C'$ on the extension or arm $C^2$ of the valve element C.

Secured to the casing by bolts $k$ is a bracket or support K for an indicator L. This bracket is provided with a hollow extension $k'$ which projects through an opening $a^8$ in the wall of the casing A and into the chamber $a'$. The inner end of the extension is provided with a cup or journal $k^2$ to receive the indicator spindle M. This spindle extends through the brass nut $k^3$ screwed into the bracket. The spindle is tapered at $m$ and this tapered part rotates in contact with the soft metal seat $k^4$ set in the nut $k^3$. The extension $k'$ is cut away at $k^5$, through which extends the gear or pinion $M'$ carried by the shaft or spindle M and to which it is rigidly secured. Formed on the face of the valve element C are the crown teeth $c^3$ forming a rack which meshes with the pinion $M'$ and causes the spindle or shaft to rotate and the indicator needle $M^2$ secured to the shaft to move upon the movement of the valve element C.

N is a pipe connecting the cup G with the chamber $a$. In the construction shown this connection is made through the intermediate chamber or trap $a^{11}$ which communicates with the chamber $a$ by the channel or passageway $a^{12}$. The pipe is provided with a valve $n$ to control the flow of liquid between the chamber $a$ and the cup G. O is an overflow pipe connected to the trap $a^{11}$ for drawing off any excess liquid that may collect in measuring any suitable fluid such as steam or gas passing through the apparatus.

The casing A is provided with a pet-cock $a^{13}$ to be used in relieving the pressure from the meter casing when both the inlet and outlet valves leading to the meter are closed. The cup G may be provided with a tube $g^2$ having a valve $g^4$ therein for drawing off any liquid from the cup as may be desired.

The operation of the device is as follows: Assuming that the flow of fluid to be measured passes through the meter in the direction of the arrow $x$, when the ports $b, b$, in the seat element are closed or covered by the valve C there is no flow through the meter. In that case the static pressure of the fluid on the upstream side of the meter is maintained in the chamber $a^{11}$ owing to its connection by the passage $a^{12}$ with the chamber $a$, and through the pipe N approximately the same static pressure is maintained in the cup G. The static pressure in the chamber $a'$ on the downstream side of the valve C and above the weighted piston J is at least two pounds per square inch less than the static pressure on the upstream side of the valve due to the fact that the weight per square inch of the plan area of the piston is two pounds. When the difference in the static pressure in the two chambers $a$ and $a'$ becomes greater than two pounds the piston rises, moves the valve C to uncover the ports $b$ and reduces the difference of pressure on the two sides of the valve to the said difference of two pounds per square inch, which corresponds to the weight of the piston.

Figure 1:
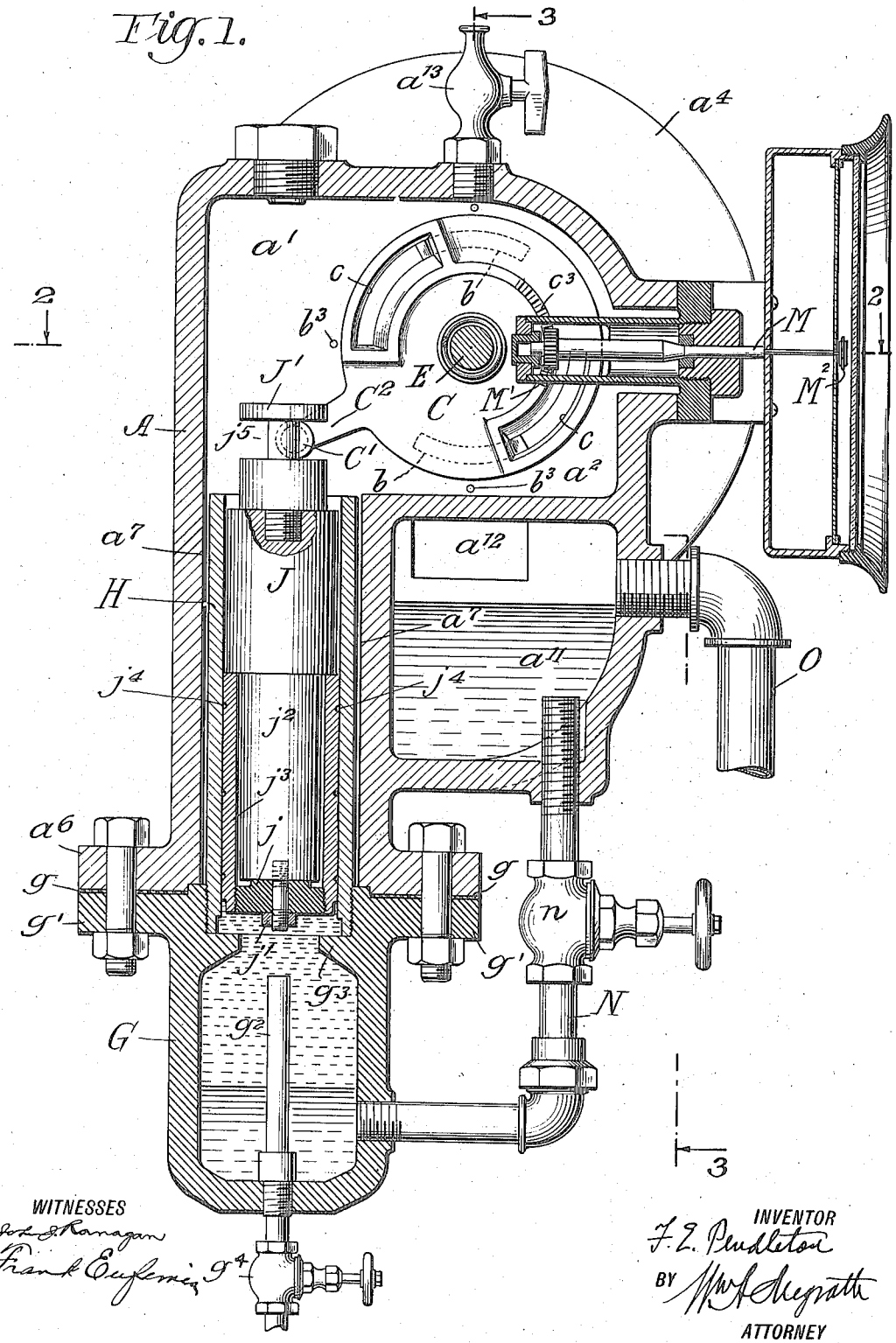
Figure 1 is a section on line 1 of Fig. 3.
Figure 2:
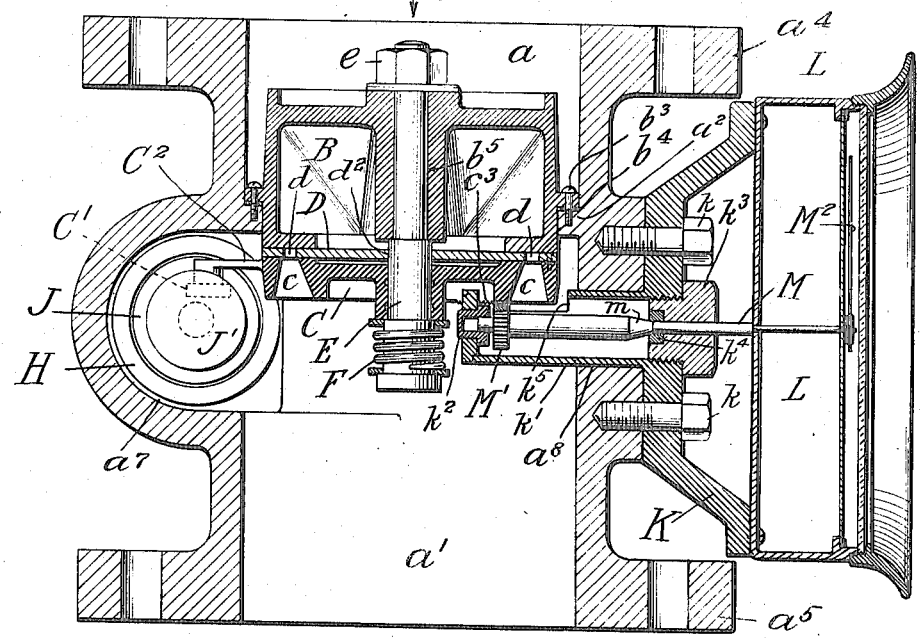
Fig. 2 is a section on line 2 of Fig. 1.

Assuming the inlet valve, not shown, in the line pipe on the upstream side of the meter to be wide open and the outlet valve, not shown, in the line pipe on the downstream side of the meter to be closed, the ports are in the position shown in Figs. 1, 2 and 3 of the drawing with the piston J in its lowest position resting on the inwardly projecting flange $g^3$ of the cup G, the valve C covering the ports $b$ and the needle or pointer $M^2$ of the indicator L registering zero or zero flow. If now the outlet valve on the downstream side of the meter in the line pipe be slightly opened, the pressure of the fluid in the chamber $a'$ on the downstream side of the valve will be reduced and with a constant initial pressure in the chamber $a$ on the upstream side of the valve there will be a lifting force exerted on the weighted piston J through the passageway $a^{12}$, chamber $a^{11}$, pipe N and cup G, causing the piston to rise to move the valve C, causing the ports $b$ to be uncovered, as shown in Figs. 4 and 5 of the drawing, whereupon the fluid will flow through the ports in an increasing amount until the static pressure on the downstream side of the valve is again but two pounds less than the static pressure above the valve, when the piston and valve will come to rest and the amount of fluid passing through the ports will be equal to the quantity of fluid which is being discharged through the outlet valve of the meter which will be indicated by the pointer $M^2$ of the indicator L which is operated through the rack and pinion connection $c^3$ and $M'$ upon the movement of the valve.

If the fluid to be measured is a liquid, the chambers $a$, $a'$ and $a^{11}$, the cup G and the connecting pipe N are normally filled with the liquid and the overflow pipe O may be dispensed with. If the liquid be of low viscosity such as water, it is desirable to replace the liquid below the piston J and in the upper part of the cup G with a liquid of greater viscosity such as heavy oil, which will float on the liquid in the lower part of the cup and above the level of the connecting pipe N, as shown in Fig. 1 of the drawing. The use of an oil of high viscosity prevents leakage of any liquid past the piston J and into the chamber $a'$.

If the fluid to be measured be steam or any other condensable vapor it will be desirable to trap away any excess of water or condensation that would otherwise collect in the chamber $a$ and cause trouble and obstruct the flow of liquid. In measuring steam, therefore, the lower part of the chamber $a^{11}$ together with the pipe N and the lower part of the cup G, is filled with water as shown in Fig. 1 of the drawing, the normal level of the water in the chamber $a^{11}$ being at the lower edge of the pipe O, and the space above said water level serving as a catch or reservoir for collecting the water of condensation from the pipe line and when the collected water in the chamber $a^{11}$ rises above the normal water line, it flows out through the pipe O. If in the measurement of any fluid there are pulsations in the flow due to any cause, such pulsations will be transmitted to the water in the chamber $a^{11}$, pipe N and cup G, producing oscillations in the piston J, which are transmitted to the valve C and the indicator needle or pointer $M^2$ in such manner as to interfere with the proper reading or indication of the flow of the fluid. In such case the valve $n$ in the pipe N is adjusted to throttle the flow to reduce said pulsations to a minimum or to any desired amount and hence control said oscillations. When the flow through the meter is shut off the valve C in closing entirely covers the ports $b$ before the piston J has reached its lowest position, and after closure of the ports the piston J continues to move downwardly causing a still further movement of the valve C so that when the piston is at rest the valve has moved an appreciable amount past the closing position of the ports so as to produce an effective seal and prevent any sizzling or slight escape of the fluid through the orifice. The total pressure on the valve C against the seat necessary to counterbalance the difference of pressure on the two sides of the ports is but a slight amount, due to the fact that the difference of pressure is but two pounds per square inch and the area of the ports is but a small amount of the total area of the pipe through which the fluid is flowing. Thus, in a one inch meter the combined area of the two ports need not be more than $\tfrac{3}{10}$ of a square inch, and the total difference of pressure that must be counterbalanced by the spring F is but $\tfrac{6}{10}$ of a pound. Of course, it will be necessary to have an excess of tension in the spring to insure no leakage between the valve and seat in addition to counterbalancing the difference in pressure on the two sides of the ports. The indicator needle should be at zero reading on the dial scale at the instant that the adjacent edges of the orifice or port in the valve C and of the port $b$ of the seat element are in line, and the indicator needle will move below zero when the valve is moved to its extreme closed position. In order to properly set the indicator needle, both the inlet and outlet valves in the line pipes of the meter are closed and the pet-cock $a^{13}$ is opened to allow release of pressure of the fluid on the downstream side of the valve C. If now the inlet valve of the meter be slightly opened a slight increase of pressure will occur on the upstream side of the valve C, the piston J will rise and when the valve C uncovers the ports $b$ there will immediately be a discharge of fluid from the pet-cock $a^{13}$, when the indicator needle should indicate and be set at zero after which the pet-cock should be closed. If during the use of the meter the oil in the cup G should leak past the piston J and be carried away by the flow of fluid it will be necessary to replenish the oil in said cup. To do this the valve $g^4$ in the valve pipe is opened, and if water appears it will indicate that the oil is exhausted from the cup G. If oil appears it is drawn off until the water begins to show. Then a predetermined quantity of oil is forced into the cup through the valve pipe so as to fill the upper part of the cup down to the water level above the pipe N.

By the word "exhibiting" and by the phrase "exhibiting means" employed herein I mean to include any one of the different kinds of mechanisms which are commonly referred to in this and allied arts as recorders, or registers, or indicators, or integrating devices.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. In a fluid measuring device, a casing having two chambers therein and an opening or port communicating with said chambers through which the fluid flows from one chamber to the other, a rotatable valve governing the port and movable across the direction of flow of the fluid, and means for automatically operating the valve.

2. In a fluid measuring device, a casing having two chambers therein and an opening or port communicating with said chambers through which the fluid flows from one chamber to the other, a rotatable valve governing the port and movable across the direction of flow of the fluid, means for automatically operating the valve, exhibiting means, and connections between the valve and said means whereby the exhibiting means is operated upon the movement of the valve.

3. In a fluid measuring device, a casing having two chambers and an opening or port connecting the two chambers through which the fluid flows, a rotatable valve governing the port and movable across the direction of flow of the fluid through the port, and means for automatically producing movement of said valve, said movement being produced by the difference in pressure of the fluid on the opposite sides of the port.

4. In a fluid measuring device, a casing having two chambers and an opening or port connecting the two chambers through which the fluid flows, a rotatable valve governing the port and movable across the direction of flow of the fluid through the port, means for automatically producing movement of said valve, said movement being produced by the difference in pressure of the fluid on the opposite sides of the port, and exhibiting means connected to the valve and operable upon the movement of the valve.

5. In a fluid measuring device, a casing, a wall or diaphragm separating the casing into two chambers, and provided with an opening or port, a rotatable valve movable in a plane parallel to said wall or diaphragm and governing said port, means for automatically operating the valve, exhibiting means, and connections between said means and the valve whereby the exhibiting means is moved upon the movement of the valve.

6. In a fluid measuring device, a casing, a wall or diaphragm dividing the casing into two compartments, said wall having a port therein, a rotatable valve movable in a plane across said port, and means for moving the valve, said means being actuated by the difference of pressure on the two sides of the wall.

7. In a fluid measuring device, a casing, a wall or diaphragm dividing the casing into two compartments, said wall having a port therein, a rotatable valve movable across said port, means for moving the valve, said means being actuated by the difference of pressure on the two sides of the wall, exhibiting means, and connections between the said means and the valve.

8. In a fluid measuring device, a casing, a wall or diaphragm dividing the casing into two chambers, said wall having an opening or port therein, a valve movable across said port, another chamber in said casing containing a liquid, a piston supported by the liquid, connections between the piston and valve, and means for changing the level of the liquid in the liquid chamber.

9. In a fluid measuring device, a casing, a wall or diaphragm dividing the casing into two chambers, said wall having an opening or port therein, a valve movable across said port, another chamber in said casing containing a liquid, a piston supported by the liquid, connections between the piston and valve, means for changing the level of the liquid in the liquid chamber, exhibiting means, and connections between the said means and the valve to operate said means upon the movement of the valve.

10. In a fluid measuring device, a casing, a wall or partition dividing the casing into two chambers, said wall having a port connecting said chambers, a rotatable valve movable across said port, a chamber containing a liquid, connections between the said liquid chamber and the other two chambers, a piston supported by the liquid, and connections between the piston and valve.

11. In a fluid measuring device, a casing, a wall or partition dividing the casing into two chambers, said wall having a port connecting said chambers, a rotatable valve movable across said port, a chamber containing a liquid, connections between the said liquid chamber and the other two chambers, a piston supported by the liquid, connections between the piston and valve, exhibiting means, and connections between the exhibiting means and the valve whereby upon movement of the valve the exhibiting means is operated.

12. In a fluid measuring device, a casing, a wall dividing the casing into two chambers provided with a passage or port connecting the two chambers, a valve movable across the said port, a third chamber, connections between said third chamber and each of the other chambers, the said third chamber being provided with a liquid, a piston in said liquid chamber, a packing surrounding said piston to prevent leakage of fluid past the piston, connections between the piston and the valve, an exhibiting device, connections between the said device and the valve whereby upon the movement of the valve the exhibiting device will be operated, and a valve to control the connections between the liquid chamber and one of the other chambers.

13. In a fluid measuring device, a casing, a wall dividing the casing into two compartments, provided with a passage, a valve seat having a port therein secured to the wall, a spindle secured to said valve seat, a valve having a port therein mounted on said spindle to rotate parallel with the valve and to govern the ports, means for automatically operating the valve, exhibiting means, and connections between said means and the valve whereby the exhibiting means is operated upon the movement of the valve.

14. In a fluid measuring device, a casing, a wall dividing the casing into two compartments, provided with a passage, a valve seat having a port therein secured to the wall, a spindle secured to said valve seat, a valve having a port therein mounted on said spindle to rotate parallel with the valve and to govern the ports, a spring contacting with the valve to hold it in yielding operative contact with the valve seat, means for automatically rotating the valve, exhibiting means, and connections between the said means and the valve.

15. In a fluid measuring device, a casing, a partition or diaphragm dividing the casing into two chambers, one being on the upstream side of the partition and the other on the downstream side, said partition having an opening or port therein through which a fluid flows, a valve movable across the direction of flow of the fluid to govern the size of the opening or port, another chamber communicating with the chamber on the downstream side of the valve, a piston in said last mentioned chamber, connections between the valve and piston, a cup communicating with the piston chamber, a fourth chamber in the casing communicating with the chamber on the upstream side of the valve, and a pipe connecting the fourth chamber and the cup 16. In a fluid measuring device, a casing, a partition or diaphragm dividing the casing into two chambers, one being on the upstream side of the partition and the other on the downstream side, said partition having an opening or port therein through which a fluid flows, a valve movable across the direction of flow of the fluid to govern the size of the opening or port, another chamber communicating with the chamber on the downstream side of the valve, a piston in said last mentioned chamber, connections between the valve and piston, a cup communicating with the piston chamber, a fourth chamber in the casing communicating with the chamber on the upstream side of the valve, a pipe connecting the fourth chamber and the cup and a valve in said connecting pipe.

17. In a fluid measuring device, a casing, a partition or diaphragm dividing the casing into two chambers, one being on the upstream side of the partition and the other on the downstream side, said partition having an opening or port therein, through which a fluid flows, a valve movable across the direction of flow of the fluid to govern the size of the opening or port, another chamber communicating with the chamber on the downstream side of the valve, a piston in said last mentioned chamber, connections between the valve and piston, a cup communicating with the piston chamber, a fourth chamber in the casing communicating with the chamber on the upstream side of the valve, a pipe connecting the fourth chamber and the cup, and an overflow pipe connecting with the fourth chamber.

18. In a fluid measuring device, a casing, a partition or diaphragm dividing the casing into two chambers, one being on the upstream side of the partition and the other on the downstream side, said partition having an opening or port therein, through which a fluid flows, a valve movable across the direction of flow of the fluid to govern the size of the opening or port, another chamber communicating with the chamber on the downstream side of the valve, a piston in said last mentioned chamber, connections between the valve and piston, a cup communicating with the piston chamber, a fourth chamber in the casing communicating with the chamber on the upstream side of the valve, a pipe connecting the fourth chamber and the cup, and a pipe projecting into the cup.

19. A fluid measuring device consisting of a casing, a partition or diaphragm dividing the casing into two chambers, one being on the upstream side of the partition and the other on the downstream side, said partition having an opening or port therein through which a fluid flows, a valve movable across the direction of flow of the fluid to govern the size of the opening or port, another chamber communicating with the chamber on the downstream side of the valve, a piston in said last mentioned chamber, connections between the valve and piston to move the valve upon the movement of the piston, exhibiting means, connections between the said means and the valve, a cup communicating with the piston chamber, a fourth chamber in the casing communicating with the upstream side of the valve, and a pipe connecting the fourth chamber and the cup.

20. A fluid measuring device consisting of a casing, a partition or diaphragm dividing the casing into two chambers, one being on the upstream side of the partition and the other on the downstream side, said partition having an opening or port therein through which a fluid flows, a valve movable across the direction of flow of the fluid to govern the size of the opening or port, another chamber communicating with the chamber on the downstream side of the valve, a piston in said last mentioned chamber, connections between the valve and piston to move the valve upon the movement of the piston, exhibiting means, gear connections between the said means and the valve, a cup communicating with the piston chamber, a fourth chamber in the casing communicating with the upstream side of the valve, and a pipe connecting the fourth chamber and the cup.

21. A fluid measuring device consisting of a casing, a valve seat having a port therein located in said casing and dividing it into two compartments, one being on the upstream side of the valve seat and the other on the downstream side, said valve seat having inclined walls forming a tapered passageway leading to the port, a valve pivoted to said valve seat, said valve having ports therein to register with the ports in the valve seat, a spring yieldingly pressing the valve to its seat, means for operating the valve, said means governed by the difference of pressure in the chamber on the upstream and the downstream side of the valve seat, an exhibiting device, and connections between the valve and the exhibiting device whereby the exhibiting device is operated upon the movement of the valve.

22. A fluid measuring device consisting of a casing, a valve seat located in the casing and dividing it into two compartments, one being on the upstream side and the other on the downstream side of the valve seat, said valve seat having ports therein, a spindle secured to the valve seat, a rotating valve having ports therein mounted on the spindle, a valve plate secured to the valve, said plate having ports therein registering with the ports in the valve, the said ports in the plate being of less area than the ports in the valve, one edge of each port being inclined, the ports in the plate and in the valve registering with the ports in the valve seat and governing the area thereof, a spring carried by the spindle bearing against the valve and holding it in yielding contact with the valve seat, means for operating the valve, and an exhibiting device connected to the valve.

23. A fluid measuring device consisting of a casing, a valve seat located in the casing and dividing it into two compartments, one being on the upstream side and the other on the downstream side of the valve seat, said valve seat having ports therein and inclined walls forming tapered passageways leading to the ports, a shaft or spindle secured to the valve seat, a rotating valve having ports therein mounted on the spindle to register with the ports in the valve seat and to govern the size of the opening of the ports in the valve seat, a valve disk secured to the valve having ports therein which register with the ports in the valve but of less area than said latter ports, a spring surrounding the spindle and bearing against the valve to hold the valve in yielding engagement with the valve seat, means for operating the valve, said means governed by the difference of pressure of the fluid on the opposite sides of the valve seat, an exhibiting device connected to the casing, said device including a shaft, a gear on said shaft, and a rack on the valve meshing with said gear whereby upon the movement of the valve the exhibiting device will be operated.

24. In a fluid measuring device, a casing having an opening therein, an exhibiting device connected to said casing, said exhibiting device having a tube or extension thereon projecting through the opening in the casing, a shaft mounted in said extension, said shaft carrying a gear or pinion, means in the casing dividing it into two compartments, said means having a port therein through which the fluid flows, a valve governing said port, said valve having a rack thereon meshing with said pinion, and means for operating the valve.

25. In a fluid measuring device, a casing having an opening therein, an exhibiting device removably connected to said casing, said exhibiting device having a tube or extension thereon projecting through the opening in the casing, a shaft mounted in said extension, a gear or pinion mounted on the shaft, a wall of the extension being cut away, means in the casing dividing it into two compartments, said means having an opening or port therein, a valve governing said port or opening, and a rack carried by the valve and meshing with the gear through the cut away portion of the extension.

In witness whereof I have hereunto set my hand at the borough of Manhattan, city and State of New York, this nineteenth day of March, 1915.

FRANK E. PENDLETON.

In presence of—
  Isabel R. Richards,
  Frank Eufemia.